United States Patent
Mirchef et al.

(10) Patent No.: US 12,010,411 B2
(45) Date of Patent: Jun. 11, 2024

(54) TELEMATICS CAMERA SYSTEM

(71) Applicant: SmartWitness Holdings, Inc., Schaumburg, IL (US)

(72) Inventors: Nick Mirchef, Hoffman Estates, IL (US); Chris Pflanz, Streamwood, IL (US)

(73) Assignee: SmartWitness Holdings, Inc., Schaumburg, IL (US)

( * ) Notice: Subject to any disclaimer, the term of this patent is extended or adjusted under 35 U.S.C. 154(b) by 0 days.

(21) Appl. No.: 17/592,249

(22) Filed: Feb. 3, 2022

(65) Prior Publication Data

US 2023/0247271 A1    Aug. 3, 2023

(51) Int. Cl.

| H04N 23/54 | (2023.01) |
|---|---|
| B60R 11/04 | (2006.01) |
| G01S 19/49 | (2010.01) |
| G03B 17/56 | (2021.01) |
| G08G 1/16 | (2006.01) |
| H04N 7/18 | (2006.01) |
| H04N 23/45 | (2023.01) |
| H04N 23/51 | (2023.01) |
| B60R 11/00 | (2006.01) |
| B60R 11/02 | (2006.01) |

(52) U.S. Cl.
CPC ............ *H04N 23/54* (2023.01); *B60R 11/04* (2013.01); *G01S 19/49* (2013.01); *G03B 17/561* (2013.01); *G08G 1/166* (2013.01); *H04N 7/181* (2013.01); *H04N 23/45* (2023.01); *H04N 23/51* (2023.01); *B60R 2011/0064* (2013.01); *B60R 2011/0085* (2013.01); *B60R 11/0217* (2013.01)

(58) Field of Classification Search
CPC ........ H04N 23/54; H04N 23/51; H04N 23/45; H04N 7/181; B60R 11/04; G01S 19/49; G03B 17/561; G08G 1/166
USPC .......................................................... 348/148
See application file for complete search history.

(56) References Cited

U.S. PATENT DOCUMENTS

| 9,004,785 | B1* | 4/2015 | Mohan | G03B 17/561 |
|---|---|---|---|---|
| | | | | 348/143 |
| 9,635,319 | B1* | 4/2017 | Englander | G06V 20/597 |
| 2016/0225257 | A1* | 8/2016 | Millan | G08G 1/096 |
| 2016/0278652 | A1* | 9/2016 | Kaib | G16H 80/00 |
| 2016/0366311 | A1* | 12/2016 | Pfiffi | H04N 7/18 |
| 2018/0075309 | A1* | 3/2018 | Sathyanarayana | G05D 1/0055 |

(Continued)

*Primary Examiner* — Matthew David Kim
(74) *Attorney, Agent, or Firm* — Lee & Hayes, P.C.

(57) ABSTRACT

A telematics camera system includes a housing, including a plurality of sensors, a rotatable camera to capture an image of a first scene, a camera module receptacle configured to receive a second camera, an input port configured to be connected in communication with an electronic engine control module of a vehicle, and a side cover detachably secured to the housing and configured to partially cover an opening of the camera module receptacle. The telematics system with multiple cameras can also include a modular camera configured to be installed in the camera module receptacle and a bracket, the modular camera and bracket installed onto the housing by removing the side cover, installing the modular camera and bracket onto the housing, and securing the side cover onto the housing. Securing the side cover onto the housing locks the viewing angle of the rotatable camera and the modular camera.

20 Claims, 8 Drawing Sheets

(56) References Cited

U.S. PATENT DOCUMENTS

| | | | | |
|---|---|---|---|---|
| 2019/0297231 A1* | 9/2019 | Song | .................... | G08G 1/142 |
| 2020/0096843 A1* | 3/2020 | Linney | ............... | A63C 17/0006 |
| 2021/0188261 A1* | 6/2021 | Song | ........................ | G02B 7/02 |
| 2022/0379821 A1* | 12/2022 | Mirchef | ................. | H04N 23/57 |
| 2023/0013424 A1* | 1/2023 | Nakayama | ........... | H04N 23/951 |

* cited by examiner

TELEMATICS CAMERA SYSTEM

FIELD

This disclosure relates generally to vehicles. More particularly, this disclosure relates to electronic devices including a plurality of cameras for installation within a vehicle, such as, but not limited to, on a windshield of a vehicle.

BACKGROUND

Vehicles can include cameras installed therein for capturing an event and/or incident (e.g. collisions, etc.). Some cameras may be capable of transmitting video, tracking, and telematics data. Improved telematics camera is desirable.

SUMMARY

Some embodiments of the present disclosure relate to a vehicle monitoring system that can monitor a first scene (e.g. the view of a driver of a vehicle) and a second scene (e.g. the view of the vehicle cabin and the driver of the vehicle).

In some embodiments, a device includes a housing including: a plurality of sensors; at least one button; a speaker; an input port, the input port being in communication with an electronic engine control module of a vehicle; a rotatable camera to capture an image of a first scene; a camera module receptacle being configured to receive a second camera; a mounting element disposed over the camera module receptacle; and a side cover disposed on a first side of the housing, the side cover detachably secured to the housing by at least one fastener and configured to partially cover the opening of the camera module receptacle and to secure at least the mounting element to the housing.

In some embodiments, the housing further includes a modular camera to capture an image of a second scene, and wherein the modular camera is configured to be installed in the camera module receptacle by detaching the side cover, removing the mounting element from the camera module receptacle, installing the modular camera in the camera module receptacle, and securing the modular camera to the housing by installing the side cover onto the housing.

In some embodiments, installing the side cover onto the housing locks the viewing angle of the modular camera.

In some embodiments, installing the side cover onto the housing locks the viewing angle of the rotatable camera.

In some embodiments, the device further includes a bracket to mount the device to a vehicle, and wherein the housing is configured to connect to the bracket.

In some embodiments, the bracket includes a plurality of tabs on a first side and a surface configured to mount to a vehicle on a second side, and wherein the housing further includes a mounting area defined by a recessed region having a plurality of slots, the plurality of slots configured to receive the plurality of tabs, and wherein the bracket is attached to the housing by inserting the plurality of tabs into the plurality of slots of the housing.

In some embodiments, the bracket is installed onto the housing by removing the side cover from the housing, slidably inserting the plurality of tabs of the bracket into the plurality of slots of the housing, and securing the bracket onto the housing by installing the side cover onto the first side of the housing.

In some embodiments, the at least one fastener includes a tamper resistant head.

In some embodiments, the housing further includes: a SIM card slot; and a micro SD card slot; wherein the SIM card slot and the micro SD card slot are disposed under the side cover.

In some embodiments, the plurality of sensors includes a global positioning sensor (GPS), A-GPS, a G-sensor, gyroscope, or combinations thereof, and wherein the device automatically switches to A-GPS when standard GPS signal is lost and wherein a metadata confirms a GPS data source is from stand-alone GPS or A-GPS.

In some embodiments, the device is capable of wireless communication via 4G/LTE, WiFi, or Bluetooth, or a combination thereof, and wherein the rotatable camera supports ADAS collision and pedestrian warning.

In some embodiments, the device is capable of detecting driver fatigue or distraction and to audibly alert a driver to the detection of driver fatigue or distraction based at least partly on the image of the second scene, an input received by the plurality of sensors, a data received from the electronic engine control module of the vehicle, or a combination thereof.

In some embodiments, a system to monitor a vehicle includes a housing including: a plurality of sensors; at least one button; an input port in communication with an electronic engine control module of a vehicle; a rotatable camera to capture an image of a first scene; a camera module receptacle; and a side cover attached to a first side of the housing by at least one fastener, wherein attaching the side cover to the housing locks the viewing angle of the rotatable camera.

In some embodiments, the system further includes a modular camera to capture an image of a second scene, the modular camera configured to be installed to the housing at the camera module receptacle, wherein the modular camera is installed into the housing by removing the side cover, installing the modular camera into the camera module receptacle, and securing the side cover to the first side of the housing.

In some embodiments, securing the side cover over the modular camera and the housing locks the viewing angle of the modular camera.

In some embodiments, the system further includes a bracket to mount the housing to a vehicle, and wherein the housing is configured to connect to the bracket.

In some embodiments, the bracket includes a plurality of tabs on a first side and a surface configured to mount to a vehicle on a second side, and wherein the housing further includes a mounting area defined by a recessed region having a plurality of slots, the plurality of slots configured to receive the plurality of tabs, and wherein the bracket is attached to the housing by inserting the plurality of tabs into the plurality of slots of the housing.

In some embodiments, the plurality of sensors includes global positioning sensor (GPS), A-GPS, a G-sensor, gyroscope, or combinations thereof.

In some embodiments, the system automatically switches to A-GPS when standard GPS signal is lost and wherein a metadata confirms a GPS data source is from stand-alone GPS or A-GPS.

In some embodiments, the system is capable of detecting driver fatigue or driver distraction and to audibly alert a driver to the detection of driver fatigue or driver distraction based at least partly on the image of a second scene, an input received by the plurality of sensors, a data received from the electronic engine control module of the vehicle, or a combination thereof.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

Like reference numbers represent the same or similar parts throughout.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

Embodiments of this disclosure are directed to a telematics camera system. More specifically, the telematics camera system described in this disclosure is a simple, windshield-mounted camera. In some embodiments, the rotatable camera and the modular camera are high-definition cameras.

The telematics camera system includes a plurality of onboard sensors (e.g., global position sensor (GPS), accelerometer (e.g., a G-Sensor), temperature sensor), communications capabilities (e.g., 4G/LTE, WiFi, Bluetooth®) and interfaces directly with an engine control module (ECM) of a vehicle to capture vehicle data from the onboard diagnostics of the ECM via a communications port (e.g., OBD-II port) to provide an efficient and affordable solution for vehicle owners to capture critical incident footage, driver behavior data, vehicle health and performance data, reduce road incidents/collisions, and provide an efficient and immediate (e.g., in real-time or substantially real-time) incident warning solution to a vehicle driver.

A "telematics camera system," as used herein, includes a device capable of capturing an image or a stream of images. In some embodiments, the telematics camera system may include a rotatable camera configured to continuously capture a first scene and a detachable modular camera configured to capture a second scene. In some embodiments, the telematics camera system may be able to capture a discrete image, such as, for example, a frame of the stream of images.

Figure 1:
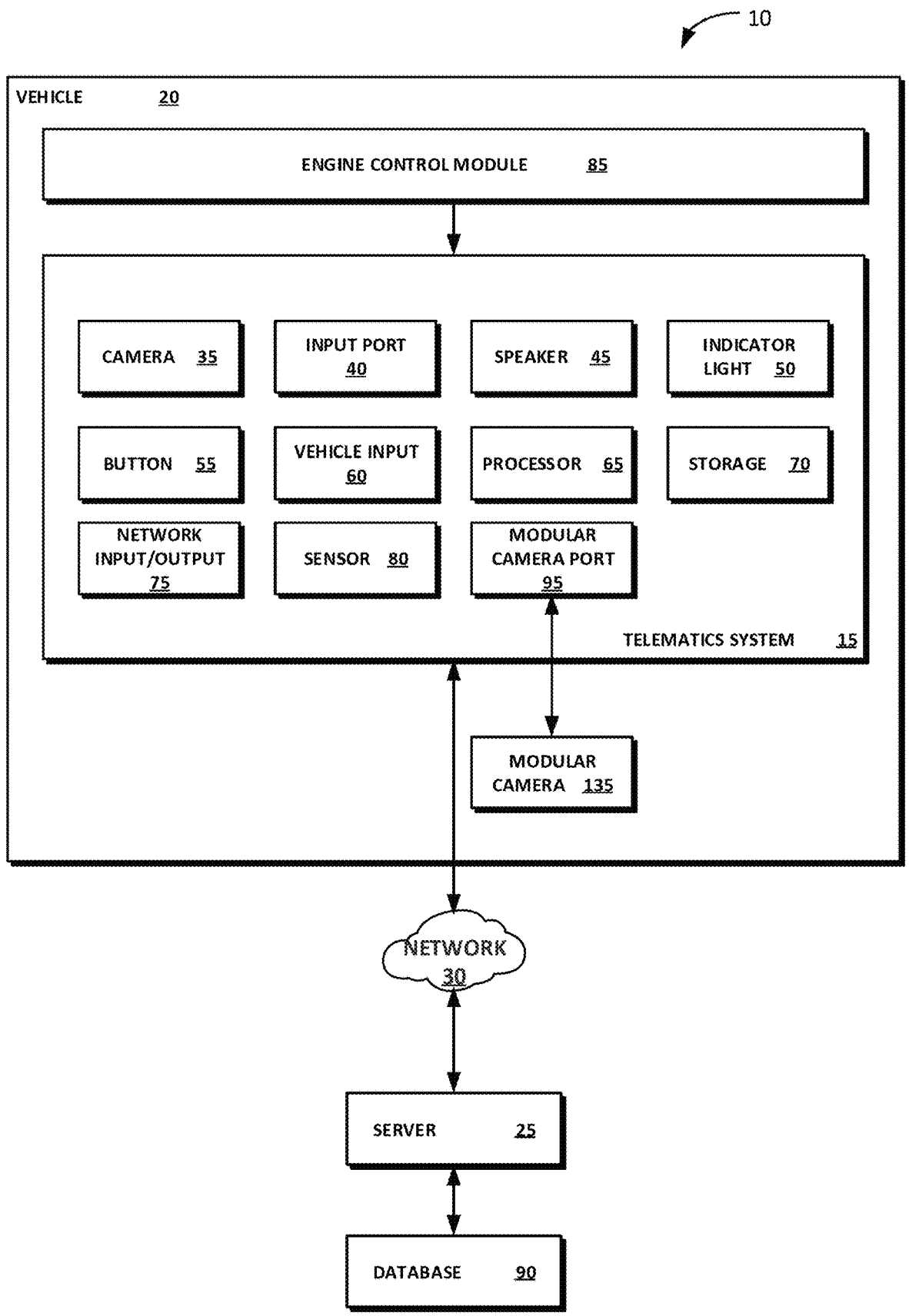
FIG. 1 is a schematic illustration of a telematics camera system including a rotatable camera and a modular camera connected to the telematics camera system, according to some embodiments.

FIG. 1 is a schematic illustration of a system 10 including a telematics camera system 15 including a rotatable camera 35 and a modular camera 135 that is configured to connect to the telematics camera system 15, according to some embodiments.

In the system 10, the telematics camera system 15 can be installed in a vehicle 20. The telematics camera system 15 can be in communication with a server 25 via a network 30. It is to be appreciated that the illustration is an example and that the system 10 can vary in architecture. Generally, the system 10 will include more than one telematics camera systems 15 and more than one vehicle 20. For example, the telematics camera system 15 and the vehicle 20 can be part of a commercial fleet of vehicles. Alternatively, individuals can utilize the same telematics camera system 15 in various vehicles 20.

The telematics camera system 15 can be installed in the vehicle 20 such as, for example, by fixing the telematics camera system 15 to a surface of the vehicle 20, such as a windshield. Alternatively, the telematics camera system 15 can be installed in the vehicle 20 by attaching the telematics camera system 15 to a bracket 310, the bracket 310 being attached to a surface of the vehicle 20 and the telematics camera system 15 being connected to the bracket 310.

In some embodiments, the telematics camera system 15 includes a housing 100 including a plurality of sensors 80, at least one button 55, a speaker 235, an input port 40, a rotatable camera 35, camera module receptacle 245, a mounting element (not pictured), and a side cover 215. In some embodiments, the input port 40 can be in communication with an electronic engine control module of a vehicle 20. In some embodiments, the camera module receptacle 245 is configured to receive a second camera. In some embodiments, the side cover 215 is disposed on a first side of the housing, the side cover 215 is configured to detachably secure to the housing 100 by at least one fastener and configured to partially cover an opening of the camera module receptacle 245 and to secure at least the mounting element to the housing 100.

In some embodiments, the telematics camera system 15 can include a rotatable camera 35 that is capable of capturing photographs, video, or combinations thereof In some embodiments, the rotatable camera 35 is capable of capturing photographs, video, or combinations thereof in high-definition. The rotatable camera 35 can include built-in infrared (IR) sensors and a day/night sensor, or a combination thereof. In some embodiments, the rotatable camera 35 may capture a scene as viewed by a driver of the vehicle 20. The rotatable camera 35 can be adjustable to account for varying windshield angles in various vehicles. In some embodiments, the system 10 supports Advanced Driver Assistance Systems (ADAS) through the rotatable camera 35. For example, the rotatable camera 35 can capture, record, and transmit an image or video of ADAS raw data (i.e. following distance and time to collision). The telematics camera system 15 can then trigger an ADAS events. Consequently, the telematics camera system 15 can relay the recorded images or video back to the server 25 or cause the telematics camera system 15 to alert the driver of an ADAS event with the speaker 235 as discussed herein below.

In some embodiments, the system 10 can include a modular camera 135 that can be connected to the telematics camera system 15 at a camera module receptacle 245. The modular camera 135 is connected to the telematics camera system 15 at the camera module receptacle 245 through the modular camera port 95. The modular camera 135 can include one or more of a universal serial bus (USB) plug, a nano sim plug, a micro SD plug, a HDMI plug, a CAT6 plug, other suitable plug capable of transmitting data and images to the telematics camera system 15. The modular camera 135 is capable of capturing photographs, video, or combinations thereof. The modular camera 135 is capable of capturing the photographs, video, or combinations thereof in high-definition. The modular camera 135 can include built-in infrared (IR) sensors and a day/night sensor, or a combination thereof. In some embodiments, the modular camera 135 may capture a scene of a cabin of vehicle 20 encompassing a driver. The modular camera 135 can be adjustable to account for varying windshield angles in various vehicles. In some embodiments, the modular camera 135, when connected to the telematics camera system 15, can capture, record, and transmit an image or video as part of Driver State Monitoring (DSM) without another hardware device. The DSM can analyze an image or series of images to detect driver fatigue or driver distraction. When driver fatigue or driver distraction is detected, the telematics camera system 15 can relay those images or series of images to the server 25. Alternatively, the telematics camera system 15 can alert the driver of a DSM triggered event with the speaker 235 as discussed herein below.

In some embodiments, the modular camera 135 can be arranged in the camera module receptacle 245 of the housing 100 so that when the telematics system with telematics camera system 15 is installed on a windshield of a vehicle, the modular camera 135 is oriented toward a rear of the vehicle (e.g., the cabin of the vehicle encompassing the driver). The mounting element (not pictured) can be configured to be removed from the first surface 220 of the housing 100 to allow the modular camera 135 to be inserted into the camera module receptacle 245. The mounting element may then be installed onto the first surface 220 of the housing 100 to secure the modular camera 135 in the camera module receptacle 245.

In some embodiments, the modular camera port 95 can include one or more of a universal serial bus (USB) port, a nano sim port, a micro SD port, a HDMI port, a CAT6, other suitable plug capable of transmitting data and images, or any combination thereof The telematics camera system 15 can further include an input port 40, a speaker 235, an indicator light 50, speaker 235, vehicle input 60, a processor 65, storage 70, network input/output 75, and sensor 80.

In some embodiments, the telematics camera system 15 includes the input port 40. The input port 40 can include one or more of a universal serial bus (USB) port, a nano sim port, a micro SD port, or any combination thereof. In some embodiments, the input port 40 can receive an appropriate device to expand a storage of the telematics camera system 15. In some embodiments, the input port 40 can be used to receive an input to, for example, update firmware of the telematics camera system 15. In some embodiments, the input port 40 can be used to connect multiple cameras (e.g., in a daisy chain configuration or the like).

In some embodiments, the telematics camera system 15 can include the speaker 235. The speaker 235 can be used to provide audible alerts or warnings to a user operating the telematics camera system 15 or the vehicle 20. For example, the telematics system with telematics system with telematics camera system 15 may be able to detect drowsiness of a driver and, in response to the detection, provide an audible alert via the speaker 235 to rouse the driver.

In some embodiments, the telematics camera system 15 can include the indicator light 50. The indicator light 50 can be used to provide status feedback to a user. In some embodiments, the telematics system with telematics system with telematics camera system 15 can include a plurality of indicator lights. In some embodiments, the telematics system with telematics system with telematics camera system 15 includes three indicator lights.

In some embodiments, the telematics camera system 15 can include at least one button 55. In some embodiments, the at least one button 55 can be a plurality of buttons 55. For example, the housing 100 can include a volume adjustment button, a record button, a power button, an emergency button, or any combination thereof. In some embodiments, for example, the volume button may adjust the volume of the audible alerts received from the speaker 235. In some embodiments, the record button, when pressed, may initiate a recording operation (i.e., saving of image data, vehicle data, etc.). For example, in case of an incident, an operator of the vehicle could press the record button to ensure that the telematics camera system 15 is saving the image data received from the rotatable camera 35 and the modular camera 135. In some embodiments, the telematics camera system 15 can include more than one storage partition. In such an embodiment, in response to the button press, the image data, vehicle data, or any combination thereof, could be stored on a partition including a rule which prevents overwriting of the image data, vehicle data, or any combination thereof. Alternatively, the operator of the vehicle could press the emergency button to signal to the telematics camera system 15 that an emergency has occurred and to begin recording from the rotatable camera and/or the modular camera, to store or transmit the recorded image(s) to a server 25 through the network 30, or to store or transmit the image(s) from a period of time before the emergency button was pressed and after to continue recording images from when the emergency button was pressed.

In some embodiments, the telematics camera system 15 can include a vehicle input 60. In some embodiments, a cable can be permanently connected to the vehicle input 60. In such embodiments, the end not connected to the vehicle input 60 can include a male connector for connecting to a port on the vehicle 20. For example, the male connector can be an OBD-II type connector for connecting to an extension cable or directly to the vehicle 20. In some embodiments, the cable connecting the telematics camera system 15 to the vehicle 20 can be a 5-wire cable including power, ground, ignition, RS232 TX/RX. The vehicle input 60 is configured to be connected in electronic communication with an electronic control module (ECM), such as ECM 85. The ECM 85 can provide vehicle data to the telematics camera system 15. In some embodiments, the ECM 85 also provides power to the telematics camera system 15. As such, when the vehicle 20 is powered on (e.g., the ignition is on), the telematics camera system 15 is also powered on. In some embodiments, the vehicle input 60 can be a power input only. In such embodiments, vehicle data may not be provided to the telematics camera system 15, but whenever the vehicle 20 is powered, the telematics camera system 15 is also powered.

In some embodiments, the telematics camera system 15 can include the processor 65 and storage 70. In some embodiments, the processor 65 can be a multi-core processor, such as a quadcore processor. In some embodiments, the storage 70 can be representative of an embedded MultiMediaCard ("eMMC") storage. In some embodiments, the storage 70 can be representative of a flash-based storage media. In some embodiments, the storage 70 is a non-volatile memory. The storage 70 can receive a continuous stream of video data from the rotatable camera 35, and store the video data in the storage 70. In some embodiments, the video data can be stored for a limited period of time, then transmitted to the server 25 via the network 30. In some embodiments, the video data can be stored until the storage 70 reaches a particular capacity, then the storage 70 can transmit the video data to the server 25. In some embodiments, the particular capacity can be a maximum capacity of the storage 70. In some embodiments, the particular capacity can be less than the maximum capacity of the storage 70. In some embodiments, when the storage 70 reaches a particular capacity, the video data (oldest first) can be overwritten. In some embodiments, the storage 70 can also be used to store vehicle data such as, but not limited to, vehicle speed, engine RPM, GPS coordinates, heading, ignition status, throttle percentage, engine temperature, or any combination thereof. Similar to the video data, the vehicle data can be transmitted periodically to the server 25. In some embodiments, when the storage 70 is full, the additional data received can overwrite the prior received data.

In some embodiments, data stored on the storage 70 (vehicle data, video data, or any combination thereof), can be automatically transmitted or uploaded to the server 25 in response to an event, such as a collision, a hard brake application, a forward collision warning, a lane departure warning, driving over a speed limit, hard cornering, quick acceleration, a press of the speaker 235, an indication that a following distance is too short, in response to a g-sensor value exceeding a threshold, in response to a revolution per minute (RPM) exceeding a threshold, in response to a location trigger, or any combination thereof In some embodiments, the storage 70 can include a plurality of partitions for storing vehicle data, video data, or any combination thereof. In such embodiments, in response to an event, the vehicle data, video data, or any combination thereof can be flagged and stored in a partition that is not overwritable (e.g., for preservation of review in the future).

In some embodiments, the telematics camera system 15 can include the network input/output 75. In some embodiments, the network input/output 75 is configured to transmit data via the network 30. The network input/output 75 can transmit data via the network 30 via a wireless connection using, for example, frequency bands including frequency ranges within the wireless spectrum of 2.4 GHz and 5 GHz (e.g., WiFi), a short-range wireless technology used for exchanging data between devices over relatively short distances using UHF radio waves in the ISM bands, from 2.402 GHz to 2.480 GHz (e.g., Bluetooth®), cellular, 3G, 4G, 5G, or other wireless protocol.

In some embodiments, the telematics camera system 15 can include a sensor 80. The sensor 80 can include a global positioning sensor (GPS), A-GPS, an accelerometer or G-sensor, a gyroscope, or any combination thereof. In some embodiments, the telematics camera system 15 can include multiple sensors. In some embodiments, the sensor 80 may be used to provide additional information regarding the status of the vehicle. For example, if a sudden acceleration is measured, the sensor 80 may have detected a collision. In some embodiments, the GPS can be used to provide location and or heading data. In some embodiments, the telematics camera system 15 can automatically switch to A-GPS when standard GPS signal is lost and wherein a metadata confirms a GPS data source is from stand-alone GPS or A-GPS.

The system 10 includes the server 25 in electronic communication with the telematics camera system 15 via the network 30. The server 25 can receive combinations of video data and vehicle data from the telematics camera system 15. In some embodiments, the server 25 can make the data available to a user via an electronic interface such as, but not limited to, a website, a mobile application, or the like.

In some embodiments, the network 30 can be representative of the Internet. In some embodiments, the network 30 can include a local area network (LAN), a wide area network (WAN), a wireless network, a cellular data network, combinations thereof, or the like.

In some embodiments, the server 25 may also be in electronic communication with a database 90. The database 90 can include, among other features, the vehicle data received from the telematics system with telematics system with telematics camera system 15. In some embodiments, the database 90 can store all vehicle data received for a particular period of time (e.g., one year, one month, one week, one day, etc.). In some embodiments, the database 90 can store vehicle data in response to a problem condition (e.g., a collision or the like). It is to be appreciated that the various roles of the server 25 and the database 90 can be distributed among the devices in the system 10. For example, in some embodiments, the database 90 can be maintained on the server 25, or in some embodiments, remote from the server 25. In some embodiments, the database 90 can be cloud-based.

In some embodiments, the telematics camera system 15 can detect driver fatigue or distraction and to audibly alert a driver to the detection of driver fatigue or distraction based at least partly on the image of the second scene captured by the modular camera 135, an input received by the plurality of sensors 80, a data received from the electronic engine control module of the vehicle 20, or a combination thereof.

Figure 2:
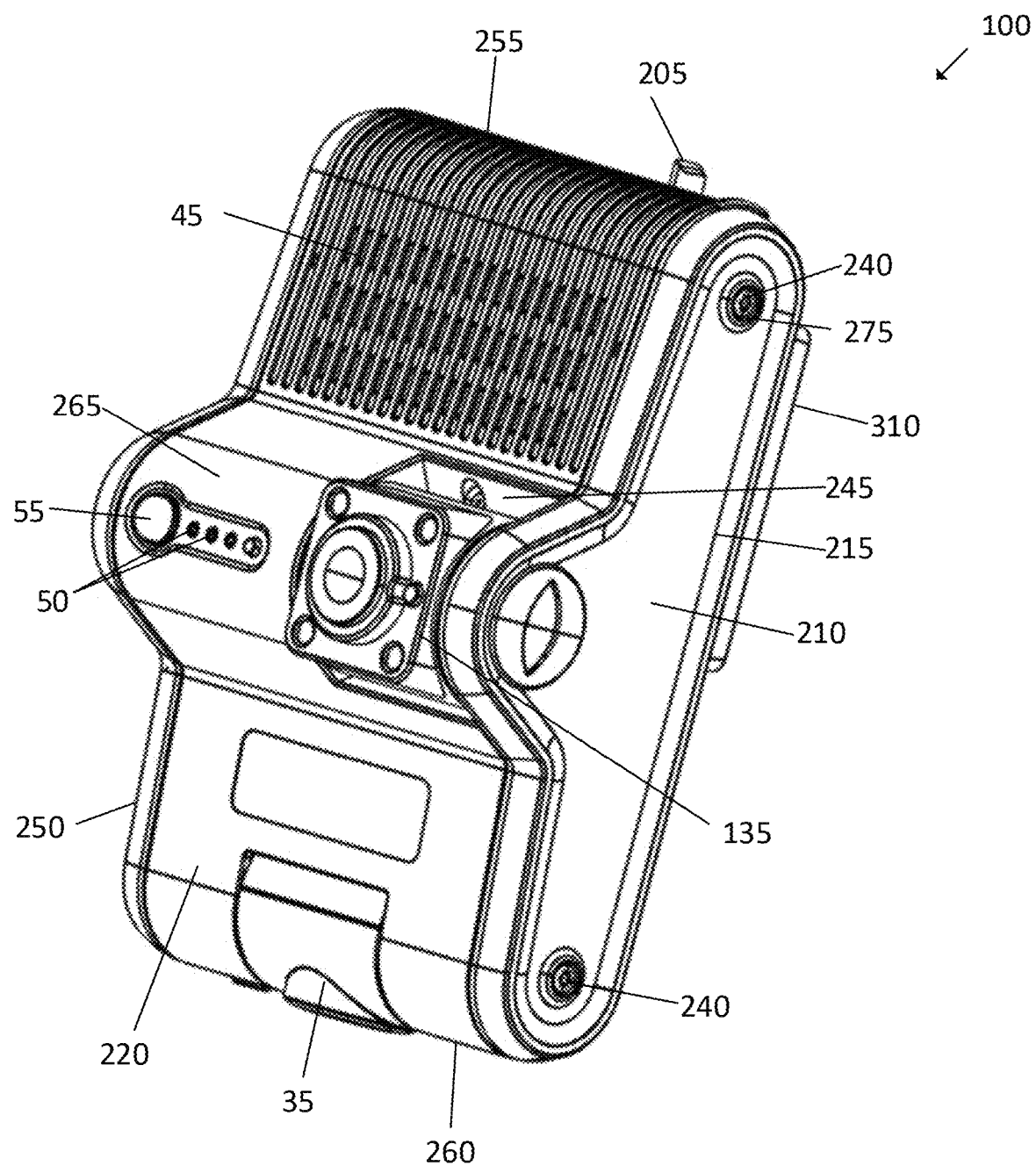
FIG. 2 shows a front perspective view of the telematics camera system, according to some embodiments.
Figure 3:
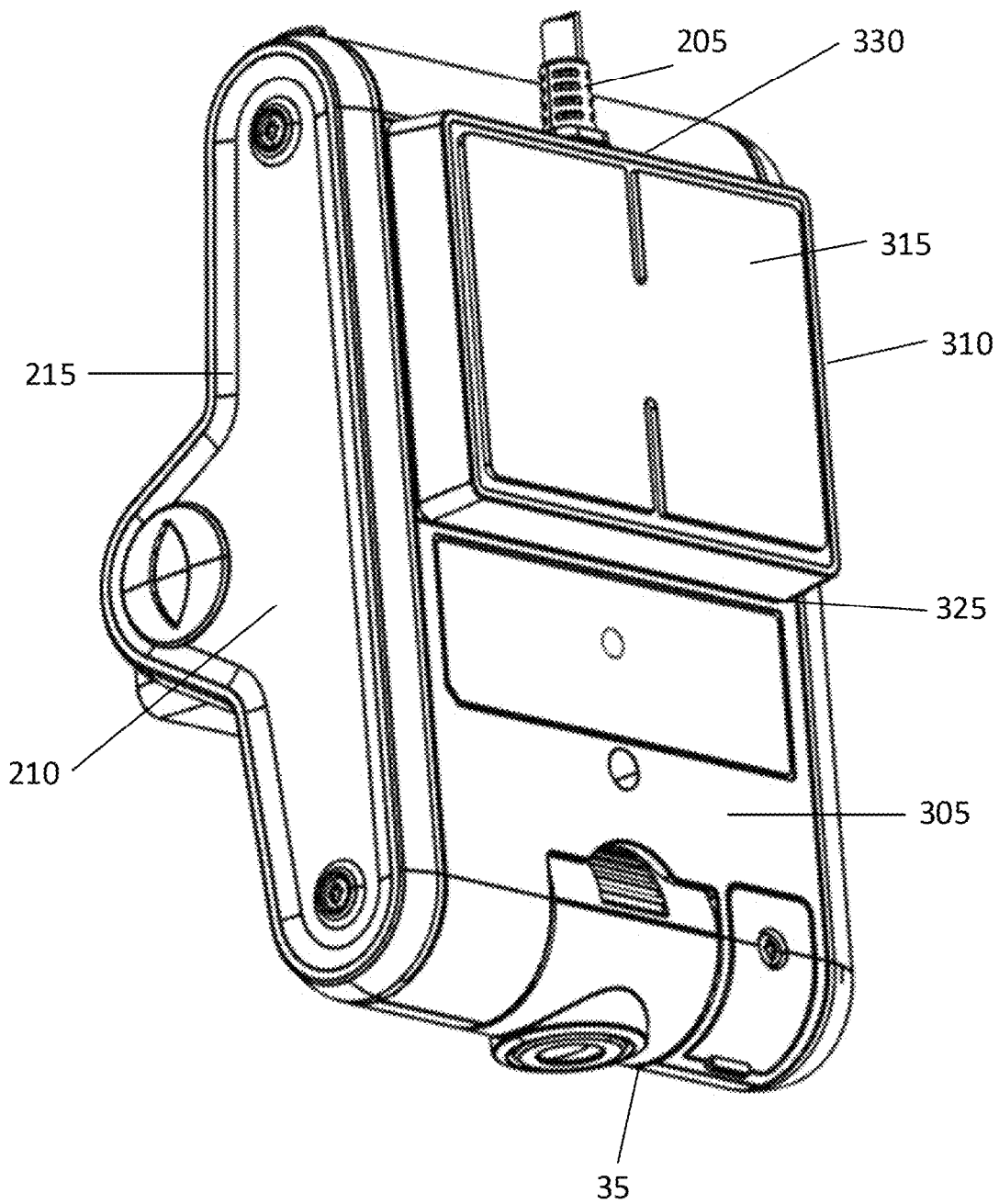
FIG. 3 shows a rear perspective view of telematics camera system, according to some embodiments.
Figure 4:
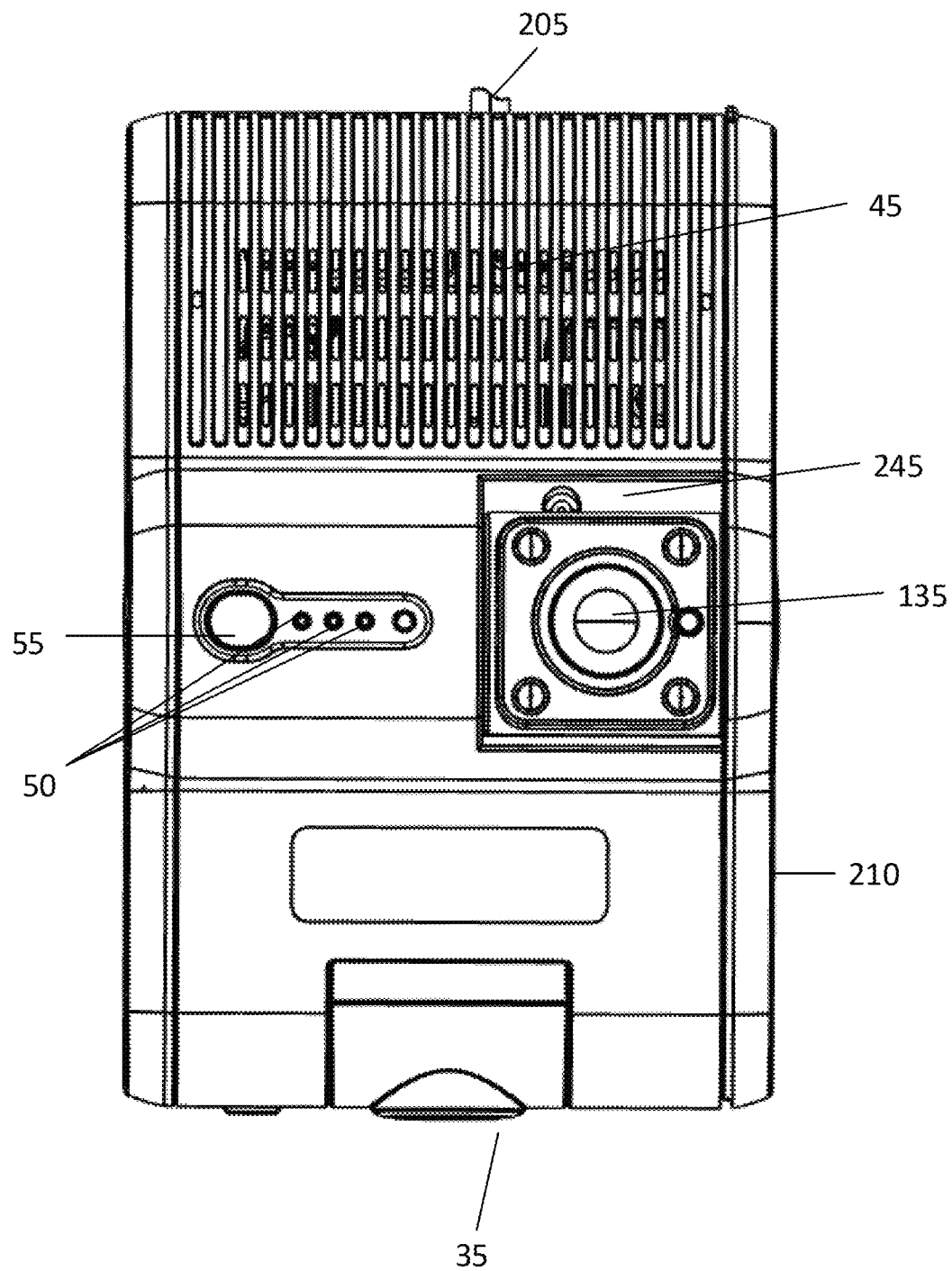
FIG. 4 shows a frontside view of the telematics camera system, according to some embodiments.
Figure 5:
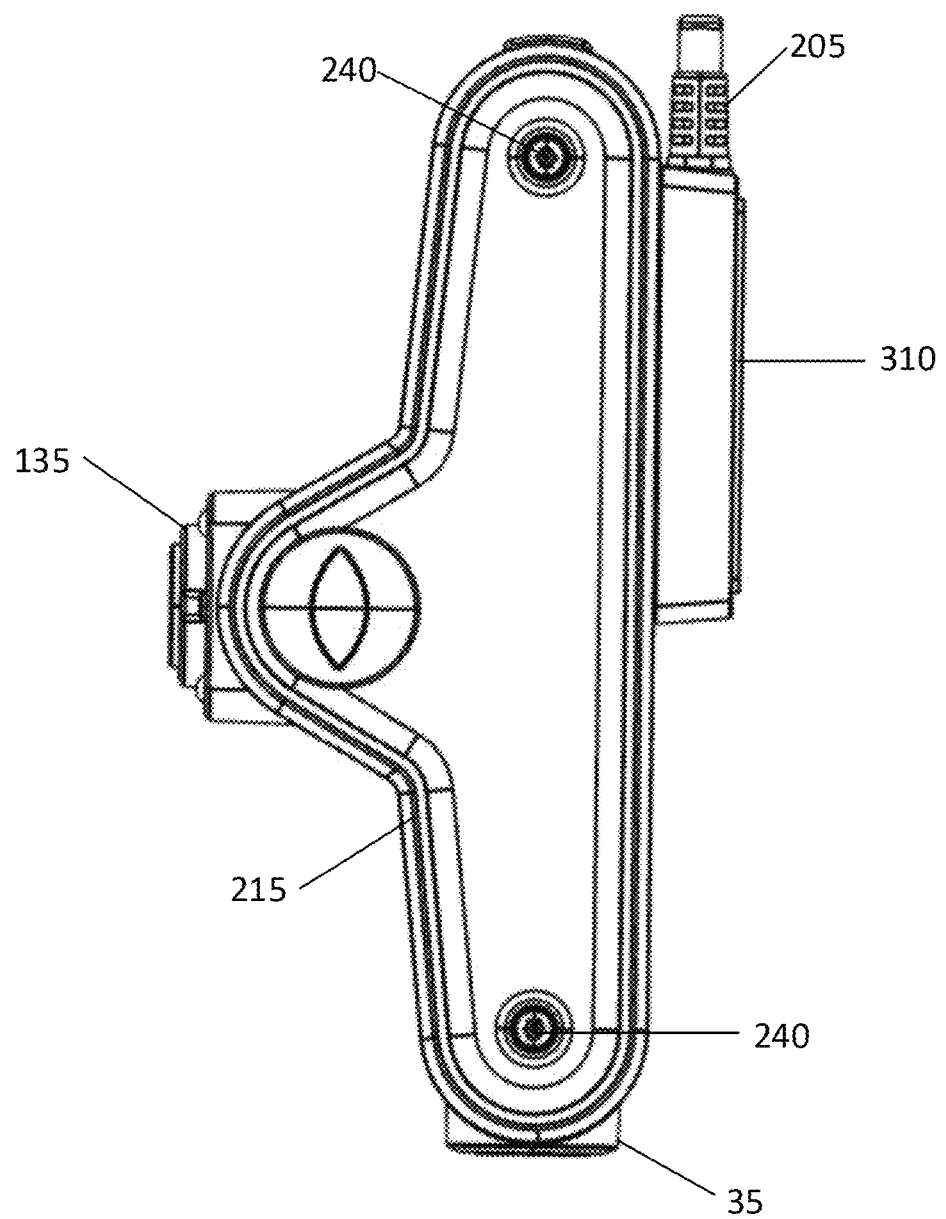
FIG. 5 shows a side view of the telematics camera system, according to some embodiments.
Figure 6:
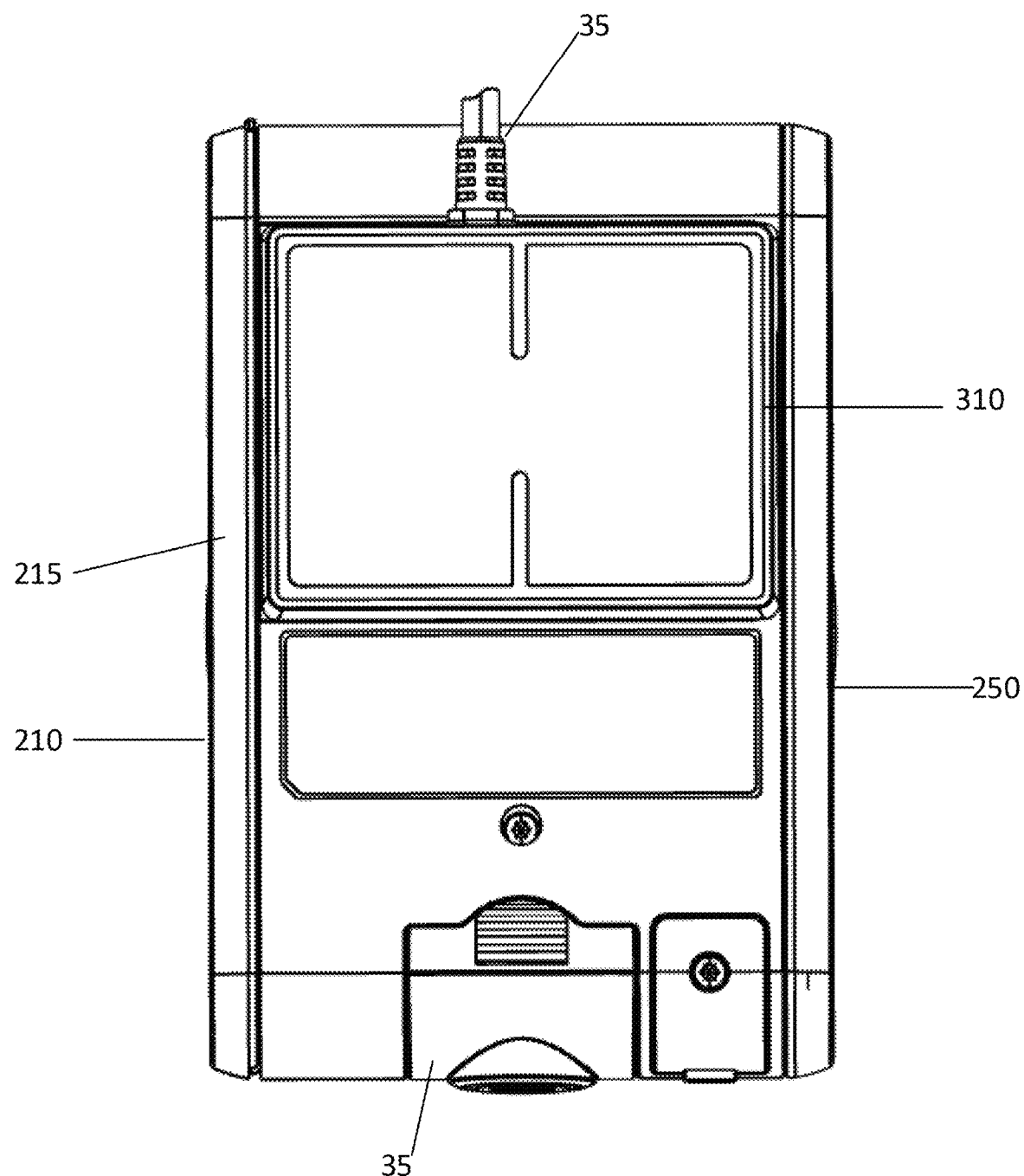
FIG. 6 shows a backside view of the telematics camera system, according to some embodiments.

FIGS. 2-6 show different views of the telematics camera system 15 of FIG. 1, according to some embodiments. FIG. 2 shows a front perspective view of the telematics camera system 15 with multiple cameras, according to some embodiments. FIG. 3 shows a rear perspective view of the telematics system with multiple cameras, according to some embodiments. FIG. 4 shows a frontside view of the telematics camera system, according to some embodiments. FIG. 5 shows a side view of the telematics camera system, according to some embodiments. FIG. 6 shows a rear view of the telematics camera system, according to some embodiments.

Referring to FIGS. 2 and 4, the telematics camera system 15 can include a housing 100. The housing 100 can include a plurality of sensors, at least one button 230, a speaker 235, an input port 205 disposed at a first end 255 of the housing 100, the input port 205 being in communication with an ECM of a vehicle 20, a rotatable camera 35 located at a second end 260 opposite the first end 255 to capture an image of a first scene, a camera module receptacle 245 located on a first surface 220 of the housing, the camera module receptacle being defined by a recess on the first surface 220 and one side of the recess being an opening along the first side, the camera module receptacle 245 being configured to receive a second camera through the opening on the first side 210, a mounting element 270 located on the first surface 220 over the camera module receptacle 245, and a side cover 215 located on the first side 210, the side cover 215 secured to the housing by at least one fastener 240 and configured to partially enclose the opening of the camera module receptacle 245, at the first side 210, and to secure at least the mounting element 270 to the housing 100 when the side cover 215 is secured to the first side 210 by the at least one fastener 240.

The housing 100 is generally designed to have a compact form factor. In some embodiments, the form factor of the housing 100 (size), can have a length L, a width w, and a thickness t. In some embodiments the length L can be from 115 mm to 130 mm. In some embodiments, the width W can be from 70 mm to 100 mm. In some embodiments, the thickness t can be from 50-80 mm. In one embodiment, the length L can be 126 mm, the width w can be 82 mm, and the thickness t can be 64 mm (including the modular camera).

In some embodiments, the telematics camera system 15 can include a modular camera 135 to capture an image of a second scene. The modular camera 135 can be configured to be installed into the housing 100 through the camera module receptacle 245 when the mounting element 270 and the side cover 215 are removed from the housing 100. In some embodiments, the modular camera 135 can include a rotatable element that allows a user installing the modular camera 135 to alter the viewing angle of the modular camera 135 relative to the housing 100. The rotatable element is configured to be locked to prevent the modular camera 135 from being rotated when the side cover 215 is installed onto the first side 210 of the housing 100. For example, the modular camera 135 can be installed into the housing 100 before being installed in a vehicle 20. To install the modular camera 135, the side cover 215 is removed from the housing 100. The mounting element 270 is also removed from the top opening of the camera module receptacle 245. The modular camera 135 is then installed into the camera module receptacle 245 in place of the mounting element 270 and secured to the housing 100 by securing the side cover 215 by the at least one fastener 240. Further, in some embodiments, the viewing angle of the modular camera 135 can be locked in place to prevent a user from altering the viewing angle of the modular camera 135 relative to the housing 100 by securing the side cover 215 to the housing 100, thereby locking the rotating element in the modular camera 135. In some embodiments, the image of the second scene is an image of the vehicle 20 cabin. The image can also include an image of the driver of the vehicle 20 while the driver is in the vehicle 20 cabin and while the driver is operating the vehicle 20.

In some embodiments, the first surface 220 of the housing 100 can include a raised segment 265 on the first surface 220 that extends from the first side 210 to a second side 250 of the housing 100. The raised segment 265 can also be centrally disposed on the first surface 220. In certain embodiments, the raised segment 265 can house at least one button 55, at least one indicator light 50, and the camera module receptacle 245. In some embodiments, the shape of the side cover 215 can complement the profile of the first side 210 when the first surface 220 has a raised segment 265 on the first surface 220. The raised segment 265 can improve the viewing angle of the modular camera 135 when installed into the housing 100. Thus, while the viewing angle of the modular camera 135 may be relatively limited if the camera module receptacle 245 were disposed within the housing 100, the viewing angle of the modular camera 135 is much wider since the raised segment 265 removes the restriction that the camera module receptacle 245 would have if it were located within the housing 100.

In some embodiments, the side cover 215 can have a form substantially similar to the first side 210 of the housing 100 and that fully encompasses the first side 210. The side cover 215 can have at least one hole 275 to allow the at least one fastener 240 mount the side cover 215 to the housing 100. In some embodiments, the side cover 215 can have two holes to allow two fasteners mount the side cover 215 to the first side 210. Further embodiments of the side cover 215 will be discussed herein below.

In some embodiments, the first surface 220 of the housing 100 can further include at least one indicator light 50. It is to be appreciated that the number, shape, and arrangement of the plurality of the buttons 55 and the plurality of the indicator light 50 may vary.

In some embodiments, a cable (not shown) can extend from the housing 100 at the input port 205. The cable can be to provide the communication to the ECM 85 (FIG. 1) of the vehicle 20 (FIG. 1). The cable is connected to the input port 40 of the housing 100.

Referring to FIGS. 3 and 6, the housing 100 includes a bracket 310 located on a second surface 305 near the input port 205. One side of the bracket 310 being attached to the housing 100 and the bracket 310 having a mount side 315 to mount the housing 100 on the surface of the vehicle 20. In some embodiments, the input port 205 can ben connected to the housing through a top side 330 of the bracket 310 rather than on the first end 255.

Figure 7:
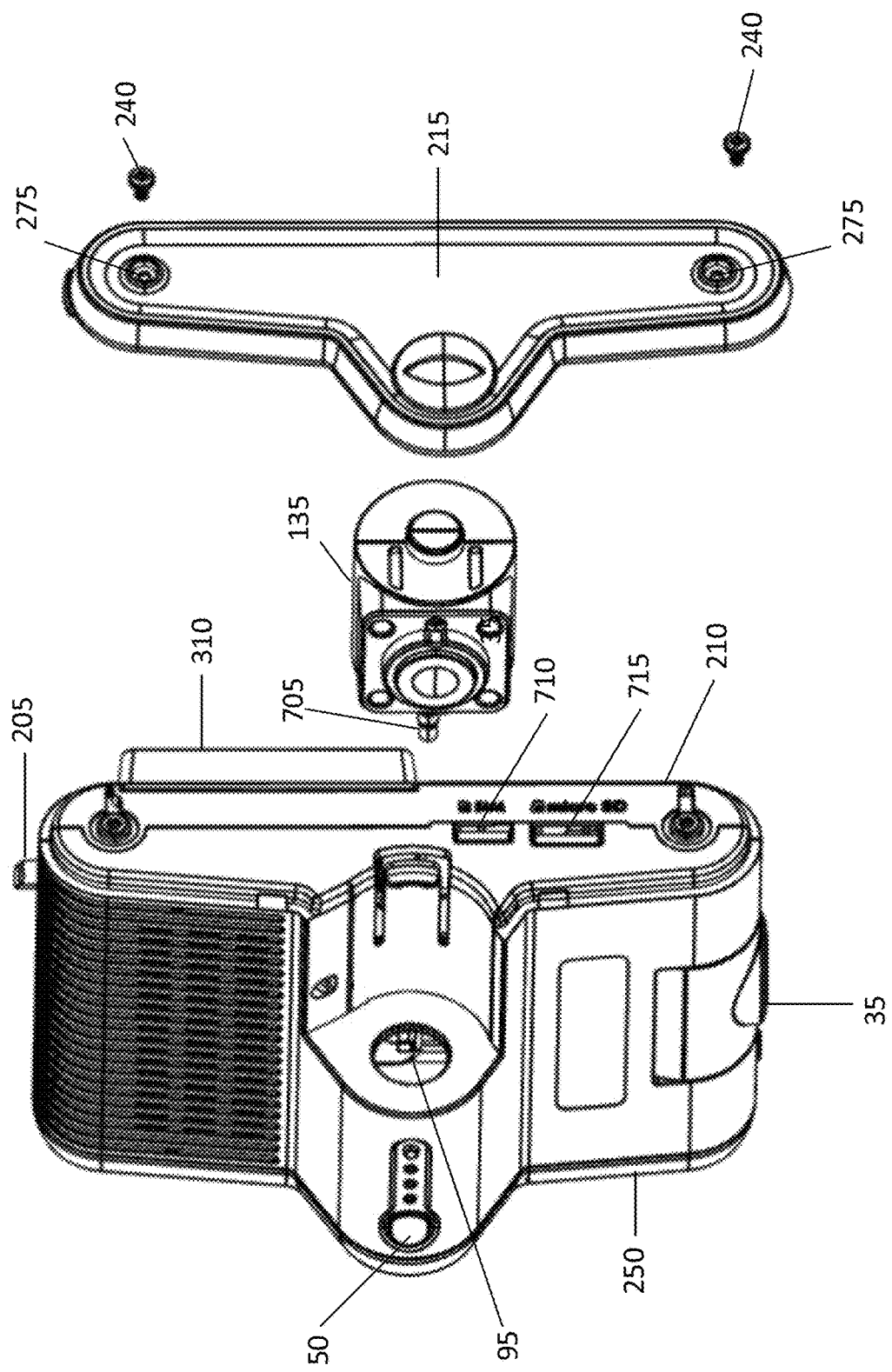
FIG. 7 shows a partially exploded view of the telematics camera system, including the modular camera, according to some embodiments.

FIG. 7 shows a partially exploded view of the telematics camera system, including the modular camera, according to some embodiments. The modular camera 135 is configured to be installed into the housing 100 by connecting a camera plug 705 of the modular camera 135 to the modular camera port 95 when the side cover 215 is removed from the first side 210 of the housing 100. Once the modular camera 135 is installed into the housing 100 of the telematics camera system 15, the viewing angle of the modular camera 135 is determined based on the angle of the surface the housing 100 is mounted on. Then, the side cover 215 is secured to the housing 100 by the at least one fastener 240.

In some embodiments, the side cover 215 secures the modular camera 135 to the housing 100 when the side cover 215 is installed onto the first side 210. In some embodiments, installing the side cover 215 onto the housing 100 locks the viewing angle of the rotatable camera 35. In some embodiments, installing the side cover 215 onto the housing 100 locks the viewing angle of the modular camera 135. In some embodiments, installing the side cover 215 onto the first side 210 of the housing 100 secures the bracket 310 onto the housing 100. Furthermore, in some embodiments, the SIM card 710 and the micro SD card 715 are disposed on the first side 210 of the housing 100. When the side cover 215 is installed onto the first side 210, both the SIM card 710 and the micro SD card 715 are covered by the side cover 215 to prevent access.

In some embodiments, the at least one fastener 240 can be a thumbscrew, a plastic rivet, a plug, or a tamper resistant screw with a screw head configured to be installed into the housing 100 with a driver fitted with a tamper resistant bit. The at least one fastener 240 can be a tamper resistant screw to prevent an unauthorized person from removing the side cover 215 and subsequently tampering with a memory connected to the housing 100, removing a SIM card 710 connected to the housing 100, removing the housing 100 from the bracket 310 attached to the vehicle 20, or altering the viewing angle of the rotatable camera 35 and the modular camera 135.

In some embodiments, when the side cover 215 of the housing 100 is removed from the first side 210, an axis of rotation R for the rotatable camera 35 and the modular camera 135 may be set such that minor adjustments in the orientation of the rotatable camera 35 and the modular camera 135 are possible. This can, for example, enable adjustment of the field of view to accommodate different windshield angles of different vehicles. In some embodiments, the rotatable camera 35 has a viewing angle of 140° while the modular camera 135 has a viewing angle of 130°. In other embodiments, the rotatable camera 35 and the modular camera 135 can have a greater viewing angle depending on the form of the housing 100. In some embodiments, the modular camera 135 may be adjustable during installation, then fixed into place to avoid unwanted movement from, for example, vibrations of the vehicle in which the telematics system with telematics camera system 15 is installed, driver tampering, or any combination thereof.

In some embodiments, the mounting element 270 may be installed on the first surface 220 of the housing 100 by at least one fastener 63. In some embodiments, the at least one fastener 63 may be a screw, a thumbscrew, a reusable rivet, or other type of fastener. In other embodiments, the at least one fastener 63 may be at least two screws. In some embodiments, the at least two screws may have a variety of screw heads. For example, the screw head may be configured to receive a Philips driver tool, a flathead driver tool, a tamper resistant driver tool, or other similar tool.

Figure 8:
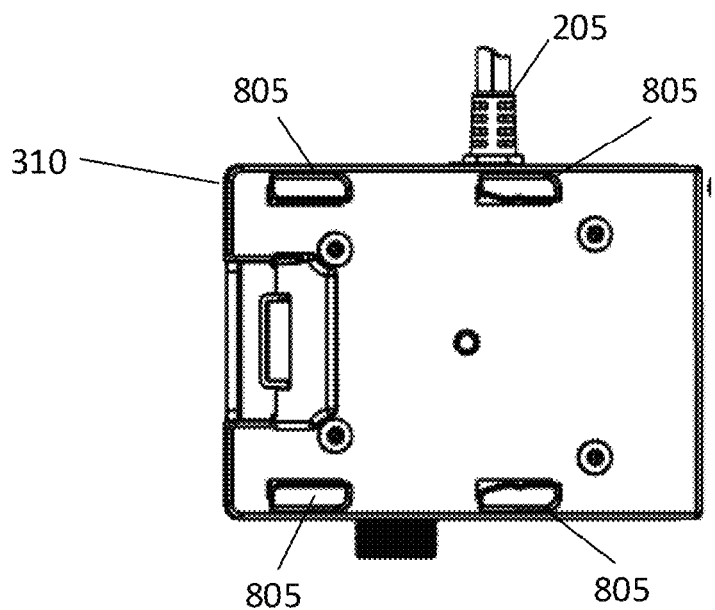
FIG. 8 shows a rear side view of the bracket of telematics camera system, according to some embodiments.
Figure 9:
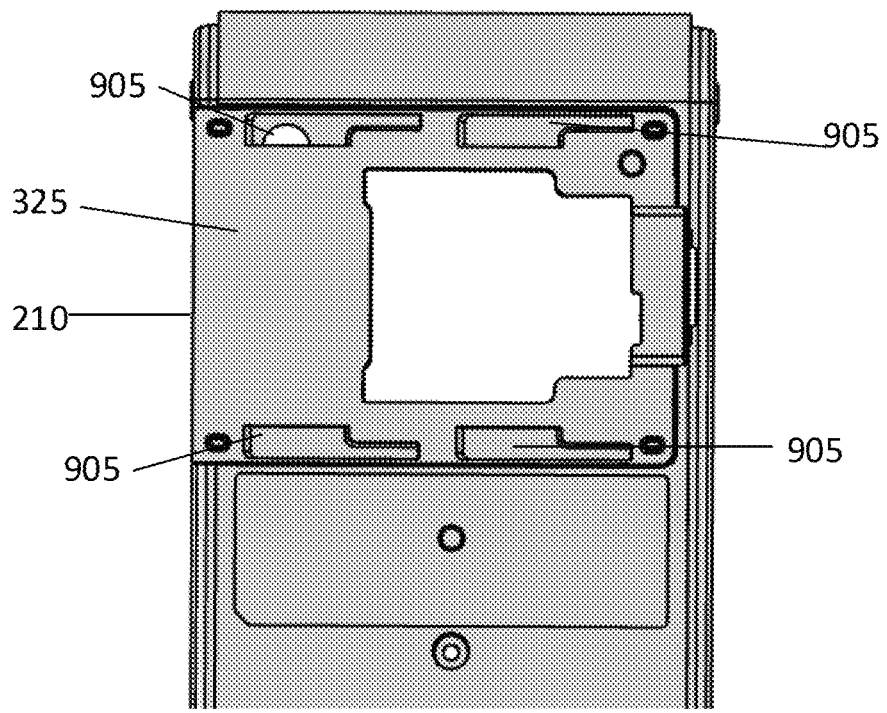
FIG. 9 shows a rear side view of the rear of the housing of the telematics camera system, according to some embodiments.

FIGS. 8-9 show different views of the telematics camera system 15 of FIG. 1, according to some embodiments. FIG. 8 shows a rear side view of the bracket 310 of telematics camera system 15, according to some embodiments. FIG. 9 shows a rear side view of the rear of the housing of the telematics camera system, according to some embodiments.

In some embodiments, the bracket 310 can be configured to attach to the housing 100 at a mounting area 325 on the second surface 305. The bracket 310 can include a plurality of tabs 805 configured to be slidably inserted into a plurality of slots 905 located in the mounting area 325. In some embodiments, the mounting area 325 can be partially defined by a recessed region on the housing 100. For example, to install the bracket 310, the side cover 215 is first removed from the first side 210 of the housing 100. Once removed, the bracket 310 is inserted into the mounting area 325 by sliding the bracket 310 into the mounting area 325 so that the plurality of tabs 805 engages into the plurality of slots 905. The bracket 310 is slid into the mounting area 325 by sliding the bracket 310 from the first side 210 towards a second side 250 until the plurality of locking tabs 805 engages with the plurality of slots 905. The side cover 215 is then reinstalled onto the first side 210 of the housing 100 and secured by the at least one fastener 240. The side cover 215 locks the bracket 310 into place in the mounting area 325 of the housing 100 so that a person cannot easily remove the housing 100 from the mounting area 325 without first removing the side cover 215. Thus, the side cover 215 acts as a deterrent that prevents a person from removing the telematics camera system 15 from the vehicle, removing the housing 100 from the bracket, removing the modular camera 135, SIM card 710, and micro SD card 715, and from altering the viewing angle of the rotatable camera 35 or the modular camera 135.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a solid state drive; a random access memory (RAM); a read-only memory (ROM); a semiconductor memory device such as, but not limited to, an erasable programmable read-only memory (EPROM), an electrically erasable programmable read-only memory (EEPROM), Flash memory such as eMMC or SD card media, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components. The meaning of "in" includes "in" and "on."

As used herein, the term "based on" is not exclusive and allows for being based on additional factors not described, unless the context clearly dictates otherwise.

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device, comprising:
    a housing comprising:
        a plurality of sensors;
        at least one button;
        a speaker;
        a rotatable camera to capture an image of a first scene;
        a camera module receptacle comprising a recess in the housing at least partially open to a first side of the housing; and
    a modular camera disposed in the camera module receptacle and configured to capture an image of a second scene; and
    a side cover disposed on the first side of the housing, the side cover detachably secured to the housing by at least one fastener and configured to partially cover an opening of the camera module receptacle and to secure the modular camera in the camera module receptacle, wherein detaching the side cover facilitates selective insertion of the modular camera into the camera module receptacle and removal of the modular camera from the camera module receptacle.

2. The device of claim 1, wherein the modular camera is configured to capture an image of a second scene, and wherein the modular camera is configured to be installed in the camera module receptacle by detaching the side cover, removing a mounting element from the camera module receptacle, installing the modular camera in the camera module receptacle, and securing the modular camera to the housing by installing the side cover onto the housing.

3. The device of claim 2, wherein installing the side cover onto the housing locks a viewing angle of the modular camera.

4. The device of claim 1, wherein installing the side cover onto the housing locks a viewing angle of the rotatable camera.

5. The device of claim 1, wherein the device further comprises a bracket to mount the device to a vehicle, and wherein the housing is configured to connect to the bracket.

6. The device of claim 5, wherein the bracket comprises a plurality of tabs on a first side and a surface configured to mount to a vehicle on a second side, and wherein the housing further comprises a mounting area defined by a recessed region having a plurality of slots, the plurality of slots configured to receive the plurality of tabs, and wherein the bracket is attached to the housing by inserting the plurality of tabs into the plurality of slots of the housing.

7. The device of claim 6, wherein the bracket is installed onto the housing by removing the side cover from the housing, slidably inserting the plurality of tabs of the bracket into the plurality of slots of the housing, and securing the bracket onto the housing by installing the side cover onto the first side of the housing.

8. The device of claim 1, wherein the at least one fastener includes a tamper resistant head.

9. The device of claim 1, wherein the housing further comprises:
    a SIM card slot; and
    a micro SD card slot;
    wherein the SIM card slot and the micro SD card slot are disposed under the side cover.

10. The device of claim 1, wherein the plurality of sensors includes a global positioning sensor (GPS), A-GPS, a G-sensor, gyroscope, or combinations thereof, and wherein the device automatically switches to A-GPS when standard GPS signal is lost and wherein a metadata confirms a GPS data source is from stand-alone GPS or A-GPS.

11. The device of claim 1, wherein the device is capable of wireless communication via 4G/LTE, WiFi, or Bluetooth, or a combination thereof, and wherein the rotatable camera supports ADAS collision and pedestrian warning.

12. The device of claim 1, wherein the device is capable of detecting driver fatigue or distraction and to audibly alert a driver to the detection of driver fatigue or distraction based at least partly on the image of the second scene, an input received by the plurality of sensors, a data received from the electronic engine control module of the vehicle, or a combination thereof.

13. A system to monitor a vehicle, comprising:
    a housing comprising:
        a plurality of sensors;
        at least one button;
        a rotatable camera to capture an image of a first scene;
        a camera module receptacle comprising a recess in the housing at least partially open to a first side of the housing; and
        a modular camera disposed in the camera module receptacle and configured to capture an image of a second scene; and
    a side cover attached to a first side of the housing by at least one fastener, wherein attaching the side cover to the housing locks a viewing angle of the rotatable camera, the side cover being configured to partially cover an opening of the camera module receptacle and to secure the modular camera in the camera module receptacle, wherein detaching the side cover facilitates selective insertion of the modular camera into the camera module receptacle and removal of the modular camera from the camera module receptacle.

14. The system to monitor a vehicle of claim 13, wherein the modular camera is installed into the housing by removing the side cover, installing the modular camera into the camera module receptacle, and securing the side cover to the first side of the housing.

15. The system to monitor a vehicle of claim 14, wherein securing the side cover over the modular camera and the housing locks a viewing angle of the modular camera.

16. The system to monitor a vehicle of claim 14, wherein the system is capable of detecting driver fatigue or driver distraction and to audibly alert a driver to the detection of driver fatigue or driver distraction based at least partly on the image of the second scene, an input received by the plurality of sensors, a data received from the electronic engine control module of the vehicle, or a combination thereof.

17. The system to monitor a vehicle of claim 13, wherein the system further comprises a bracket to mount the housing to a vehicle, and wherein the housing is configured to connect to the bracket.

18. The system to monitor a vehicle of claim 17, wherein the bracket comprises a plurality of tabs on a first side and a surface configured to mount to a vehicle on a second side, and wherein the housing further comprises a mounting area defined by a recessed region having a plurality of slots, the plurality of slots configured to receive the plurality of tabs, and wherein the bracket is attached to the housing by inserting the plurality of tabs into the plurality of slots of the housing.

19. The system to monitor a vehicle of claim 13, wherein the plurality of sensors includes global positioning sensor (GPS), A-GPS, a G-sensor, gyroscope, or combinations thereof.

20. The system to monitor a vehicle of claim 19, wherein the system automatically switches to A-GPS when standard GPS signal is lost and wherein a metadata confirms a GPS data source is from stand-alone GPS or A-GPS.

* * * * *